UNITED STATES PATENT OFFICE.

CHARLES J. EAMES, OF NEW YORK, N. Y.

REDUCTION OF IRON ORE.

SPECIFICATION forming part of Letters Patent No. 479,408, dated July 26, 1892.

Application filed December 5, 1891. Serial No. 414,157. (No specimens.)

*To all whom it may concern:*

Be it known that I, CHARLES J. EAMES, a citizen of the United States, residing at New York city, in the State of New York, have invented certain new and useful Improvements in the Reduction of Iron Ores; and I hereby declare the following to be a full, clear, and exact description of the same, such as will enable others skilled in the art to apply the invention.

My present invention relates to what is termed the "direct process" for the manufacture of iron and steel, or that process wherein the deoxidation of the ore and the production of "sponge" is effected by subjecting mixtures of ore and a suitable carbon to a reducing heat in hearths, reverberatories, stacks, or other suitable furnaces; and it consists, generally stated, in the utilization of "California bitumen," or, as it is commonly termed "brea," as a reducing agent in the manufacture of iron sponge, substantially in the manner as hereinafter more fully pointed out.

The scarcity and high price on the Pacific coast, especially in California, of reducing agents—such as coal, coke, charcoal, graphite-carbon, and like carbons commonly employed—precludes the economical manufacture of "iron sponge" as at present practiced. There, however, exists in nearly all parts of southern California, and notably in Buena Ventura and Newhall and in the Pico mountains, a bituminous substance commonly termed "brea," which is found in immense deposits, sometimes covered with brea-rock, beneath which is the liquid brea, and at other times upon the surface as an exudation which has become hard and dry. I have discovered that a peculiarity of this bituminous matter, termed "brea," wherein it differs from other bitumens, pitch, tar, or like carbons lies in the fact that in the process of reducing the ore thereby all the carbon of the reducing agent is consumed by the nascent oxygen from the ore, so that the resultant product or reduced ore is perfectly free from unconsumed carbon, is a finished iron of the quality and character of merchant iron, and, further, as the brea is substantially free from sulphur, the iron produced requires no further treatment. This bituminous matter is, however, in its natural state generally contaminated by a mixture of sand and other foreign matters—often to the extent of eighty per cent., (80%)— which precludes its use as a reducing agent in the manufacture of iron sponge, and, further, when found as "liquid brea" it cannot in that condition be properly disseminated throughout the broken ore to insure good results in the reduction process. In carrying out my invention I first melt this crude bitumen or brea until the same is sufficiently fluid to permit the precipitation of the contained sand and other impurities, after which the liquid brea is decanted or drawn off and allowed to cool and become hard. When hard, or, if preferred, while yet liquid, about twenty per cent. (20%) of finely-ground iron ore is added and the whole mass ground together until a sufficiently fine and dry reducing powder is obtained. The iron ore to be treated is also reduced to at least a granular condition, and preferably a fine powder, and thereto is added about twenty-five per cent. (25%) of its weight of the pulverized brea hereinbefore specified, the whole being intimately mixed to disseminate thoroughly the reducing agent throughout the mass of pulverized ore. The ore thus prepared may be subjected to a reducing heat in any suitable furnace or hearth—as, for instance, in a reverberatory furnace having a bed layer of coke or equivalent carbon to support a stratum of the mixed pulverized ore and brea.

One of the modes in which the above-described charge may be successfully treated for the production of sponge is as follows: Within a suitable furnace or closed chamber I prepare a bed or bottom layer of lump coke or broken carbon and bring said layer to a state of incandescence by means of an air-blast or other suitable manner. The air-blast is then cut off and the incandescent bed layer covered with a stratum of finely-broken coke or carbon, after which upon the foundation thus formed I erect vertical walls or columns of the charge of iron ore and brea hereinbefore specified, interposing between the same packings or partition-walls of broken carbon, after which the furnace is closed and a limited blast of air or of mixed air and gas is admitted to the incandescent bed layer to supply the necessary reducing gas and maintain the requisite temperature. When this process has been conducted until the ore of the charge has been reduced or deoxidized throughout, the temperature can be raised to agglutinate the metallic particles, the charge withdrawn and submitted to the squeezers.

Having thus described my invention, what I claim, and desire to secure by Letters Patent, is—

1. The method herein described for reducing iron ore, which consists in adding to the ore the bituminous reducing agent termed "brea," grinding the two together to obtain an intimate mixture and pulverulent mass, and finally subjecting the mixture thus obtained to a reducing heat in a suitable furnace, substantially as and for the purposes specified.

2. The process herein described for reducing iron ore, which consists in liquefying the bituminous reducing agent termed "brea," adding thereto iron ore to assist in pulverization, pulverizing the admixture of brea and iron ore, adding the pulverulent reducing agent thus obtained to the mass of ore to be reduced, and finally subjecting the whole to a reducing heat in a suitable furnace, substantially as and for the purposes specified.

In testimony whereof I affix my signature, in presence of two witnesses, this 27th day of November, 1891.

CHARLES J. EAMES.

Witnesses:
D. C. COLLIER,
H. H. BURTON.